US008430495B2

(12) United States Patent
Oyanagi et al.

(10) Patent No.: US 8,430,495 B2
(45) **Date of Patent: *Apr. 30, 2013**

(54) INK JET RECORDING METHOD AND RECORDED MATTER

(75) Inventors: Takashi Oyanagi, Matsumoto (JP); Akio Ito, Matsumoto (JP)

(73) Assignee: Seiko Epson Corporation (JP)

( * ) Notice: Subject to any disclaimer, the term of this patent is extended or adjusted under 35 U.S.C. 154(b) by 106 days.

This patent is subject to a terminal disclaimer.

(21) Appl. No.: 12/963,824

(22) Filed: Dec. 9, 2010

(65) Prior Publication Data

US 2011/0135893 A1 Jun. 9, 2011

(30) Foreign Application Priority Data

Dec. 9, 2009 (JP) ................................ 2009-279101

(51) Int. Cl.
*G01D 11/00* (2006.01)

(52) U.S. Cl.
USPC ............................ 347/100; 347/95; 106/31.6

(58) Field of Classification Search .................. 347/100, 347/95, 96, 101, 21, 9, 20, 105, 102; 106/31.6, 106/31.13, 31.27; 523/160, 161
See application file for complete search history.

(56) References Cited

U.S. PATENT DOCUMENTS

| | | | | |
|---|---|---|---|---|
| 5,644,350 | A * | 7/1997 | Ando et al. | 347/101 |
| 5,814,685 | A * | 9/1998 | Satake et al. | 347/100 |
| 6,086,197 | A * | 7/2000 | Kubota et al. | 347/100 |
| 6,426,375 | B1 * | 7/2002 | Kubota | 347/106 |
| 7,303,619 | B2 | 12/2007 | Oyanagi | |
| 8,215,764 | B2 * | 7/2012 | Sano et al. | 347/105 |
| 2001/0020964 | A1 * | 9/2001 | Irihara et al. | 347/43 |
| 2004/0209774 | A1 * | 10/2004 | Odamura et al. | 503/227 |
| 2007/0006127 | A1 * | 1/2007 | Kuntz et al. | 717/104 |
| 2008/0028980 | A1 * | 2/2008 | Aoki et al. | 347/100 |
| 2008/0081124 | A1 | 4/2008 | Sano et al. | |
| 2009/0208651 | A1 | 8/2009 | Oyanagi et al. | |
| 2010/0009136 | A1 | 1/2010 | Oyanagi et al. | |
| 2010/0183809 | A1 | 7/2010 | Oyanagi et al. | |
| 2010/0187805 | A1 | 7/2010 | Sano et al. | |

FOREIGN PATENT DOCUMENTS

| | | | |
|---|---|---|---|
| JP | 2005-068250 | A | 3/2005 |
| JP | 2005-068251 | A | 3/2005 |
| JP | 2008-88228 | A | 4/2008 |
| JP | 2009-256565 | A | 11/2009 |
| JP | 2010-18651 | A | 1/2010 |
| JP | 2010-168411 | A | 8/2010 |
| JP | 2010-168412 | A | 8/2010 |
| JP | 2010-173082 | A | 8/2010 |

OTHER PUBLICATIONS

Translated by Computer JP2010-168411A Published Aug. 5, 2010.

* cited by examiner

*Primary Examiner* — Manish S Shah
(74) *Attorney, Agent, or Firm* — Harness, Dickey & Pierce, P.L.C.

(57) ABSTRACT

An ink jet recording method for recording an image having metallic gloss on a textile product using an ink jet recording apparatus includes forming a base layer by letting droplets of a first ink composition containing a first thermoplastic resin adhere on the textile product; and forming a metallic gloss layer by letting droplets of a second ink composition containing a metallic pigment and a second thermoplastic resin adhere on the base layer. The glass transition temperature of the first thermoplastic resin is not higher than that of the second thermoplastic resin. The formation of the base layer is performed at a temperature not lower than the glass transition temperature of the first thermoplastic resin.

5 Claims, No Drawings

INK JET RECORDING METHOD AND RECORDED MATTER

BACKGROUND

1. Technical Field

The present invention relates to an ink jet recording method and a recorded matter.

2. Related Art

Recently, a demand for printed matter having a printing surface on which an image having metallic gloss is formed has been increased. As a known method for forming an image having metallic gloss, printing has been performed by, for example, a foil stamping printing method in which a recording medium having a highly even printing surface is prepared and metal foil is pressed thereto, a method in which a metal is vacuum-deposited on a smooth printing surface of a plastic film, or a method in which metallic pigment ink is applied to a recording medium, followed by pressing.

Meanwhile, an ink jet recording method is a process for performing printing by jetting droplets of an ink composition and letting them adhere to a recoding medium such as paper. This recording method has characteristics that an image having high resolution and high quality can be printed at a high speed with a relatively small-sized apparatus configuration. Therefore, it has been investigated to use the ink jet recording method for printing a recorded matter having a metallic gloss surface. For example, in JP-A-2008-088228, an ink composition containing metal powder for ink jet printing is proposed.

However, since metallic gloss is developed by forming a smooth metallic glossy surface, when an image having metallic gloss is formed by the ink jet recording method, it has been necessary to use a recording medium having a smooth surface. That is, as the recording medium, it is necessary to use a plastic sheet having a smooth surface or coated paper provided with a surface coat.

Therefore, for example, it has been difficult for the ink jet recording method to form an image having sufficient metallic gloss on a recording medium having an uneven surface, such as textile products composed of cloth, silk, fabric, etc. Since the textile products are ink absorptive, it has also been difficult to fix, for example, metal powder on their printing surfaces.

SUMMARY

An advantage of some aspects of the invention is to provide an ink jet recording method that can record an image having satisfactory metallic gloss on textile products.

The invention can be achieved as the following aspects or application examples.

An ink jet recording method according to an aspect of the invention is a method for recording an image having metallic gloss on a textile product using an ink jet recording apparatus. The method includes:

forming a base layer by letting droplets of a first ink composition containing a first thermoplastic resin adhere on the textile product; and forming a metallic gloss layer by letting droplets of a second ink composition containing a metallic pigment and a second thermoplastic resin adhere on the base layer, wherein the glass transition temperature of the first thermoplastic resin is not higher than that of the second thermoplastic resin; and the formation of the base layer is performed at a temperature not lower than the glass transition temperature of the first thermoplastic resin.

By doing so, an image having satisfactory metallic gloss can be recorded on the textile product.

In the ink jet recording method of the invention, the glass transition temperature of the first thermoplastic resin can be −50° C. or less, and the glass transition temperature of the second thermoplastic resin can be 140° C. or more.

In the ink jet recording method of the invention, the formation of the base layer can be performed at 40 to 90° C.

In the ink jet recording method of the invention, the metallic pigment can be plate-like particles made of aluminum or an aluminum alloy, and when the major axis and the minor axis of a flat surface of each plate-like particle are respectively denoted as X and Y and the thickness of the plate-like particle is denoted as Z, the circle-equivalent diameters determined from the X-Y plane areas of the plate-like particles can satisfy the requirements that the 50% mean particle diameter R50 is 0.5 to 3 μm and that R50/Z>5.

The recorded matter according to an aspect of the invention is a textile product provided with an image having metallic gloss by the above-mentioned ink jet recording method.

According to the ink jet recording method of the invention, since a base layer is formed on a textile product and a metallic gloss layer is formed on the base layer, an image having satisfactory metallic gloss can be recorded on the textile product.

DESCRIPTION OF EXEMPLARY EMBODIMENTS

Preferred embodiments of the invention will be described below. Note that the following embodiments are merely examples of the invention.

1. Ink Jet Recording Method

The ink jet recording method according to this embodiment is a method for recording an image having metallic gloss on a textile product using an ink jet recording apparatus and includes a step of forming a base layer and a step of forming a metallic gloss layer.

1.1. Recording Medium (Textile Product)

In the ink jet recording method of this embodiment, the textile product on which an image having a metallic gloss is formed is not particularly limited, and examples thereof include cloth and fabric, which are difficult to be provided with an image having metallic gloss thereon. The term "textile product" in this specification refers to, for example, cloth, fabric, and nonwoven cloth, and refers to those made of natural fibers, synthetic fibers, or mixed fibers. Specific examples of the textile product include "1005 fabric" defined in Japanese Industrial Standards JIS-L0206 (1999) and fabric described in the section "3.3 Denotation of fabric" in the JIS.

1.2. Ink Jet Recording Apparatus

In the ink jet recording method according to this embodiment, droplets of each ink composition are discharged using an ink jet recording apparatus. The ink jet recording apparatus used in the embodiment is not particularly limited as long as it can record an image by discharging ink droplets and allowing the droplets to adhere on a recording medium. In the embodiment, a textile product is used as the recording medium.

Examples of the recording system of the ink jet recording apparatus include an electrostatic aspiration system wherein recording is performed by applying a strong electric field between a nozzle and an acceleration electrode disposed in front of the nozzle, continuously ejecting ink droplets from the nozzle, and supplying a printing information signal to deflecting electrodes while the ink droplets are traveling between the deflecting electrodes, or ejecting ink droplets corresponding to the printing information signal without deflecting the ink droplets; a system wherein ink droplets are forcefully ejected by applying a pressure to an ink solution with a small pump and mechanically vibrating a nozzle with a crystal oscillator or the like; a piezo system wherein recoding is performed by simultaneously applying a pressure and a printing information signal to an ink solution with an piezoelectric element and ejecting ink droplets for recording; and a thermal jetting system wherein recording is performed by heating an ink solution to form foams using a micro electrode according to a printing information signal and ejecting ink droplets for recording.

An example of the ink jet recording apparatus includes an ink jet-type recording head, a body, a tray, a head-driving mechanism, and a carriage. Furthermore, according to need, the ink jet recording apparatus may have a mechanism for heating a recording medium during recording. Examples of the mechanism include those in which a recording medium is heated with an infrared lamp attached to the carriage and those in which a recording medium is heated by heating, for example, a roller for transporting the recording medium. Furthermore, for example, the heating may be performed by bringing a recording medium into contact with a heat source or may be performed by irradiating a recording medium with infrared rays or microwaves (electromagnetic waves having a maximum wavelength of about 2450 MHz) or blowing hot air to a recording medium, without bringing the recording medium into contact with the heat source. The heating of a recording medium may be performed before, simultaneously, or after the printing or may be performed through the printing. Furthermore, in the embodiment, when the step of forming the base layer and the step of forming the metallic gloss layer are performed at different temperatures, these steps may be conducted by, for example, increasing the number of rollers or changing portions where irradiated with infrared rays or microwaves.

The ink jet-type recording head has at least ink cartridges for four colors, cyan, magenta, yellow, and black, and is configured so that full color printing is possible. At least two of the ink cartridges are filled with the first ink composition and the second ink composition according to the embodiment and are set to the head. The ink jet recording apparatus can have an exclusive control board at the inside thereof for controlling timing of ink ejection of the ink jet-type recording head and scanning of the head-driving mechanism.

1.3. Step of Forming Base Layer

The step of forming a base layer in the ink jet recording method according to the embodiment is performed using the ink jet recording apparatus described above by discharging droplets of the first ink composition containing the first thermoplastic resin and allowing them to adhere on a recording medium (textile product). One function of the base layer formed in this step is to inhibit the second ink composition from infiltrating into the recording medium (textile product) for letting the components of the second ink composition remain on the surface of the recording medium (textile product). Another function of the base layer formed in this step is to improve the evenness of the surface of the recording medium (textile product) on which the metallic gloss layer is formed. The interface between the base layer and the metallic gloss layer described below may be clearly formed or may not be clearly formed.

The base layer forming step is performed at a temperature higher than the glass transition temperature of the first thermoplastic resin contained in the first ink composition. The heating of the recording medium (textile product) can be achieved by, for example, providing a mechanism for heating the recording medium (textile product) to the ink jet recording apparatus, as described above. The base layer forming step can be performed at a temperature that is higher than the glass transition temperature of the first thermoplastic resin and is within a range in which the ink jet recording apparatus can discharge the first ink composition. The base layer forming step can be performed, for example, at room temperature or may be performed at a higher temperature. When the textile product does not contain a material that is heat sensitive, such as synthetic fibers mentioned above, the base layer forming step can be performed, for example, at 0 to 150° C., preferably 10 to 110° C., more preferably 20 to 100° C., and most preferably 40 to 90° C. By doing so, the range of options of the first thermoplastic resin described below can be increased, and the drying rate when the first ink composition contains a solvent can be increased.

The thickness of the base layer is preferably 0.1 to 20 μm and more preferably 0.2 to 10 μm. When the thickness of the base layer is smaller than 0.1 μm, the infiltration preventing effect and the planarization effect may be insufficient.

1.4. First Ink Composition

The first ink composition used in the step of forming the base layer contains at least the first thermoplastic resin. The components contained in the first ink composition will be described below.

(1) First Thermoplastic Resin

The first thermoplastic resin contained in the first ink composition may be any resin that has a glass transition temperature (which, hereinafter, may be referred to as Tg) not higher than the temperature at which the base layer forming step is performed and also not higher than the Tg of the second thermoplastic resin described below. Examples of the first thermoplastic resin include (meth)acrylic resins, styrene acrylic resins, rosin modified resins, phenol resins, terpene-based resins, polyester resins, polyamide resins, epoxy resins, vinyl chloride-vinyl acetate copolymer resins, cellulose-based resins such as cellulose acetate butylate (CAB), and vinyl toluene-α-methylstyrene copolymer resins, and copolymers thereof.

Among these exemplified resins, as the first thermoplastic resin, the (meth)acrylic resins, that is, acrylic resins and methacrylic resins, are preferred; and a polymer of methyl methacrylate alone and a copolymer of methyl methacrylate and butyl methacrylate are more preferred.

The first thermoplastic resin has a weight-average molecular weight of 10000 to 150000 and preferably 10000 to 100000. When the molecular weight of the first thermoplastic resin is smaller than 10000, the viscosity of the first ink composition after adhesion to a recording medium (textile product) may not be sufficiently increased. When the molecular weight of the first thermoplastic resin is larger than 150000, the viscosity of the first ink composition may be too high so that an ink jet recording apparatus cannot discharge droplets of the first ink composition.

The first thermoplastic resin may be contained in the first ink composition in a solution form, in an emulsion form, or in a form in which the resin particles are dispersed. When the first ink composition contains the first thermoplastic resin in a particle form, the particle diameter of the particle is preferably 0.1 to 20 μm and more preferably 0.5 to 10 μm. A particle diameter larger than 20 μm may cause clogging of the nozzle of an ink jet recording apparatus.

The Tg of the first thermoplastic resin is not higher than that of the second thermoplastic resin. The elastic modulus of the first thermoplastic resin is increased in the temperature range lower than its glass transition temperature and is decreased in the temperature range higher than the glass transition temperature. Therefore, the first thermoplastic resin is easily plastic-deformed at a temperature higher than the glass transition temperature. A lower Tg of the first thermoplastic resin allows the formation of the base layer to be performed at a lower temperature. A larger difference between the Tg of the first thermoplastic resin and the Tg of the second thermoplastic resin can increase allowable range of temperature to be set for the base layer forming step. Furthermore, a larger difference between the Tg of the first thermoplastic resin and the Tg of the second thermoplastic resin can increase the difference between the Tg of the first thermoplastic resin and the temperature of the base layer forming step, which is conducted at a temperature between the Tg of the first thermoplastic resin and the Tg of the second thermoplastic resin. Therefore, in such a case, the functions of the first thermoplastic resin and the second thermoplastic resin can be enhanced.

As one function, the first thermoplastic resin increases the viscosity of the first ink composition when the first ink composition adheres to a recording medium (textile product) to prevent the first ink composition from infiltrating into the recording medium (textile product). As a result, the first ink composition remains near the surface of the recording medium (textile product) to form a satisfactory base layer. As another function, the first thermoplastic resin flows or deforms when the first ink composition adheres to a recording medium (textile product) to enhance the planarization of the surface of the base layer. As a result, a metallic gloss surface having satisfactory gloss can be formed when the metallic gloss layer is formed on the base layer.

The glass transition temperature of the first thermoplastic resin is preferably −100 to 110° C., more preferably −80 to 80° C., and most preferably −80 to 50° C. If the glass transition temperature of the first thermoplastic resin is too high, the ink jet recording apparatus used for recording may not be able to heat the first ink composition to a temperature higher than the glass transition temperature in the step forming the base layer. Therefore, from this viewpoint, the glass transition temperature of the first thermoplastic resin is preferably 100° C. or less, more preferably 80° C. or less, and most preferably 50° C. or less.

The content of the first thermoplastic resin in the first ink composition is 0.01 to 50% by mass, preferably 0.05 to 40% by mass, and most preferably 0.1 to 30% by mass.

(2) Other Components (2-1) Organic Solvent The first ink composition can contain an organic solvent. The organic solvent that can be used in this embodiment is preferably a polar organic solvent, of which examples include alcohols (e.g., methanol, ethanol, propanol, butanol, isopropanol, and fluorinated alcohol), ketones (e.g., acetone, methyl ethyl ketone, and cyclohexane), carboxylic acid esters (e.g., methyl acetate, ethyl acetate, propyl acetate, butyl acetate, methyl propionate, and ethyl propionate), and ethers (e.g., diethyl ether, dipropyl ether, tetrahydrofurane, and dioxane). Among these solvents, it is preferable that the first ink composition contain at least one type of alkylene glycol ether, which is liquid at ordinary temperature and ordinary pressure.

The alkylene glycol include ethylene glycol-based ethers and propylene glycol-based ethers each having an aliphatic group, such as methyl, n-propyl, isopropyl, n-butyl, isobutyl, hexyl, or 2-ethylhexyl, and an allyl or phenyl group having a double bond as the base. These alkylene glycols have no color and little smell and have characteristics of both alcohol and ether, due to the ether group and the hydroxyl group present in its molecule, and are liquid at ordinary temperature and ordinary pressure. Therefore, they are preferably used. The alkylene glycols include a monoether type in which only one hydroxyl group is substituted and a diether type in which both hydroxyl groups are substituted. These may be used in combination.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and dipropylene glycol monobutyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dipropyl ether, diethylene glycol diisopropyl ether, diethylene glycol dibutyl ether, diethylene glycol ethyl methyl ether, triethylene glycol dimethyl ether, triethylene glycol diethyl ether, triethylene glycol dibutyl ether, triethylene glycol ethyl methyl ether, tetraethylene glycol dimethyl ether, tetraethylene glycol diethyl ether, tetraethylene glycol dibutyl ether, tetraethylene glycol ethyl methyl ether, propylene glycol dimethyl ether, propylene glycol diethyl ether, dipropylene glycol dimethyl ether, and dipropylene glycol diethyl ether.

The first ink composition can contain a lactone as an organic solvent. The lactone is a compound having a cyclic structure by an ester bond, and examples thereof include a γ-lactone of a 5-membered ring structure, a δ-lactone of a 6-membered ring structure, and ε-lactone of a 7-membered ring structure. Specific examples include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone, and ε-caprolactone, and preferred are γ-butyrolactone, δ-valerolactone, and ε-caprolactone.

In particular, the first ink composition preferably contains at least one selected from diethylene glycol diethyl ether and γ-butyrolactone, as the organic solvent.

The mixing ratio of the solvents when they are contained in the first ink composition is, for example, 0.02 to 4 parts by mass, preferably 0.05 to 2 parts by mass, of a lactone solvent based on 1 part by mass of an alkylene glycol alkyl ether solvent. The amount of the solvent mixture in the first ink composition is preferably at least 50% by mass, and more preferably 70% by mass or more. By doing so, the printing stability can be improved.

The first ink composition preferably further contains at least one solvent selected from the above-mentioned organic solvents and triethyl citrate, in addition to the solvent mixture, in order to prevent the first ink composition from vaporizing and solidifying or in order to redissolve the first ink composition when it solidified, in devices, such as a nozzle portion and a tube.

The organic solvent may be a nonionic polyoxyethylene derivative that is liquid at room temperature and atmospheric pressure. Specific examples of the nonionic polyoxyethylene derivative include polyoxyethylene alkyl ethers, such as polyoxyethylene cetyl ethers (e.g., Nissan Nonion P-208, a product of NOF Corporation), polyoxyethylene oleyl ethers (e.g., Nissan Nonion E-202S and E-205S, products of NOF Corporation), and polyoxyethylene lauryl ethers (e.g., Emulgen 106 and 108, products of Kao Corporation); polyoxyethylene alkylphenol ethers, such as polyoxyethylene octylphenol ether (e.g., Nissan Nonion HS-204, HS-205, HS-206, and HS-208, products of NOF Corporation); sorbitan monoesters, such as sorbitan monocaprylate (e.g., Nissan Nonion CP-08R, a product of NOF Corporation) and sorbitan monolaurate (e.g., Nissan Nonion LP-20R, a product of NOF Corporation); and polyoxyethylene sorbitan monoesters, such as polyoxyethylene sorbitan monostearates (e.g., Nissan Nonion OT-221, a product of NOF Corporation), polycarboxylic acid-based polymeric surfactants (e.g., Flowlen G-70, a product of Kyoeisha Chemical Co., Ltd.), polyoxyethylene higher alcohol ethers (e.g., Emulgen 707 and 709, products of Kao Corporation), tetraglycerol oleates (e.g., Poem J-4581, a product of Riken Vitamin Co., Ltd.), nonylphenol ethoxylate (e.g., Adekatol NP-620, NP-650, NP-660, NP-675, NP-683, and NP-686, products of Asahi Denka Co., Ltd.), aliphatic phosphoric esters (e.g., Adekacol CS-141E and TS-230E, products of Asahi Denka Co., Ltd.), sorbitan sesquioleate (e.g., Sorgen 30, a product of Daiichi Kogyo Seiyaku Co., Ltd.), sorbitan mono-oleate (e.g., Sorgen 40, a product of Daiichi Kogyo Seiyaku Co., Ltd.), polyethylene glycol sorbitan monolaurate (e.g., Sorgen TW-20, a product of Daiichi Kogyo Seiyaku Co., Ltd.), and polyethylene glycol sorbitan mono-oleate (e.g., Sorgen TW-80, a product of Daiichi Kogyo Seiyaku Co., Ltd.).

The above-mentioned solvents may be used alone, but use in combination can increase dispersion stability of a color material, inhibit ink volatilization, and adjust various physical properties such as viscosity.

(2-2) Surfactant

The first ink composition may contain a surfactant. An example of the surfactant that can be contained is an acetylene glycol surfactant. Specific examples thereof include 2,4,7,9-tetramethyl-5-decyne-4,7-diol, 3,6-dimethyl-4-octyne-3,6-diol, and 3,5-dimethyl-1-hexyn-3-ol. Examples of commercially available acetylene glycol surfactants include Surfynol 104, 82, 465, 485 and TG (all available from Air Products and Chemicals, Inc.), Olfin STG and Olfin E1010 (both available from Nisshin Chemical Industry Co., Ltd.), Nissan Nonion A-10R and A-13R (available from NOF Corporation), Flowlen TG-740W and D-90 (available from Kyoeisha Chemical Co., Ltd.), Emulgen A-90 and A-60 (available from Kao Corporation), and Noigen CX-100 (available from Dai-ichi Kogyo Seiyaku Co, Ltd.). Another example of the surfactant that can be contained in the first ink composition is an acrylic group-containing silicone surfactant, and examples thereof include BYK-UV3500 (a product of BYK-Chemie). These surfactants may be used alone or in combination. Each surfactant, for example, inhibits vaporization of the first ink composition in the tube for transporting the ink composition from an ink cartridge to a printer head by imparting a volatilization inhibiting property to the first ink composition and, thereby, can prevent or reduce deposition of solid contents in the tube. The content of the surfactant in the first ink composition is 0.01 to 48% by mass and preferably 5 to 30% by mass.

(2-3) Color Material and Dispersant

The first ink composition can contain a color material and a dispersant. When the first ink composition contains a color material, the base layer is colored, and the region where the base layer is exposed can be used for usual printing.

The color material contained in the first ink composition is not particularly limited and may be any color material that can be usually used in ink. Examples of the color material include pigments and dyes.

As the dye, various types of dyes that are usually used in ink jet recording, such as direct dyes, acid dyes, edible dyes, basic dyes, reactive dyes, disperse dyes, vat dyes, soluble vat dyes, and reactive disperse dyes, can be used.

The pigment is not particularly limited and may be an inorganic pigment or an organic pigment.

As the inorganic pigment, in addition to titanium oxide and iron oxide, carbon black prepared by a known method, such as a contact method, a furnace method, or a thermal method, can be used. As the organic pigment, azo pigments (including azolakes, insoluble azo pigments, condensed azo pigments, and chelate azo pigments), polycyclic pigments (for example, phthalocyanine pigments, perylene pigments, perynone pigments, anthraquinone pigments, quinacridone pigments, dioxadine pigments, thioindigo pigments, isoindolinone pigments, and quinophthalone pigments), dye chelates (for example, basic dye-type chelates and acid dye-type chelates), nitro pigments, nitroso pigments, and aniline black can be used.

As specific examples of the pigment, examples of the carbon black include C.I. pigment black 7, products of Mitsubishi Chemical corporation (e.g., No. 2300, No. 900, MCF88, No. 33, No. 40, No. 45, No. 52, MA7, MA8, MA100, and No. 2200B), products of Columbian Chemicals Company (e.g., Raven 5750, Raven 5250, Raven 5000, Raven 3500, Raven 1255, and Raven 700), products of Cabot Corporation (e.g., Regal 400R, Regal 330R, Regal 660R, Mogul L, Mogul 700, Monarch 800, Monarch 880, Monarch 900, Monarch 1000, Monarch 1100, Monarch 1300, and Monarch 1400), and products of Degussa AG (e.g., Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4).

Examples of yellow pigment include C.I. pigment yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Examples of magenta pigment include C.I. pigment red 5, 7, 12, 48(Ca), 48(Mn), 57(Ca), 57:1, 112, 122, 123, 168, 184, 202, and 209, and C.I. pigment violet 19.

Examples of cyan pigment include C.I. pigment blue 1, 2, 3, 15:3, 15:4, 60, 16, and 22.

Examples of white pigment include C.I. pigment white 6.

The pigment contained in the first ink composition preferably has an average particle diameter in a range of 10 to 200 nm and more preferably about 50 to 150 nm.

The content of the color material contained in the first ink composition is preferably in a range of about 0.1 to 25% by mass and more preferably in a range of about 0.5 to 15% by mass.

The pigment contained in the first ink composition can be used in a dispersion form prepared by dispersing the pigment in a solvent with a dispersant or a surfactant. Preferred dispersants are those that are usually used for preparation of pigment dispersion solution, for example, polymer dispersants.

The first ink composition of this embodiment may contain a plurality of color materials. For example, in addition to four fundamental colors, i.e., yellow, magenta, cyan, and black, deep or light similar color for each color can be added. That is, the first ink composition can contain, for example, light magenta as a light color and red as a deep color in addition to magenta, light cyan as a light color and blue as a deep color in addition to cyan, and gray and light black as light colors and mat black as a deep color in addition to black.

Any dispersant that is used in usual ink can be used. Preferred dispersant are those that effectively function when the solubility parameter of the organic solvent is 8 to 11. These dispersants are commercially available, and examples thereof include polyester polymers such as Hinoact KF1-M, T-6000, T-7000, T-8000, T-8350P, and T-8000EL (products of Takefu Fine Chemicals Co., Ltd.), and Solsperse 20000, 24000, 32000, 32500, 33500, 34000, and 35200 (products of Avisia Co., Ltd.), Disperbyk-161, 162, 163, 164, 166, 180, 190, 191, and 192 (products of BYK-Chemie), Flowlen DOPA-17, 22, 33, and G-700 (Kyoeisha Chemical Co., Ltd.), Ajisper PB821 and PB711 (products of Ajinomoto Co., Ltd.), LP4010, LP4050, LP4055, POLYMER 400, 401, 402, 403, 450, 451, and 453 (products of EFKA Chemicals BV). These can be used alone or in combination.

The content of the dispersant contained the first ink composition is 5 to 200% by mass and preferably 30 to 120% by mass based on the content of the color material (in particular, pigment) in the first ink composition and may be appropriately determined according to the color material to be dispersed.

(2-4) Other Additives

The first ink composition may further contain a stabilizer such as an antioxidant or an ultraviolet absorber, or a surfactant. Examples of the antioxidant include BHA (2,3-butyl-4-oxyanisole) and BHT (2,6-di-t-butyl-p-cresol), and its content in the first ink composition is 0.01 to 3.0% by mass % by mass. Examples of the ultraviolet absorber include benzophenone compounds and benzotriazole compounds, and its content in the first ink composition is 0.01 to 0.5% by mass. Examples of the surfactant include anionic, cationic, ampholytic, and nonionic surfactants, and its content in the first ink composition is 0.5 to 4.0% by mass.

(2-5) Other Resin Components

The first ink composition may further contain another resin, in addition to the first thermoplastic resin. The additional resin component may be those mentioned as examples of the first thermoplastic resin, such as (meth)acrylic resins, styrene acrylic resins, rosin modified resins, phenol resins, terpene-based resins, polyester resins, polyamide resins, epoxy resins, vinyl chloride/vinyl acetate copolymer resins, cellulose-based resins such as cellulose acetate butylate (CAB), and vinyl toluene-α-methylstyrene copolymer resins, and copolymers thereof. The Tg of the additional resin component is not particularly limited. That is, as long as the first ink composition contains the first thermoplastic resin, the effects of this embodiment can be achieved.

1.5. Step of Forming Metallic Gloss Layer

The step of forming the metallic gloss layer in the ink jet recording method according to this embodiment is performed using the above-described ink jet recording apparatus by discharging droplets of second ink composition containing at least a metallic pigment and a second thermoplastic resin and letting the droplets adhere on the base layer. One function of the metallic gloss layer formed in this step is formation of a metallic gloss surface on a recording medium (textile product). The thickness of the metallic gloss layer is preferably 0.05 to 10 μm and more preferably 0.1 to 5 μm. A thickness of the metallic gloss layer smaller than 0.05 μm may be insufficient to form metallic gloss on a printing surface.

The temperature of the metallic gloss layer forming step is not particularly limited, as long as an ink jet recording apparatus can discharge the second ink composition. For example, the metallic gloss layer forming step can be performed at room temperature and may be performed at a higher temperature. When the textile product does not contain a material that is heat sensitive, such as synthetic fibers mentioned above, the metallic gloss layer forming step can be performed at a higher temperature, for example, at 20 to 150° C., preferably 25 to 110° C., more preferably 30 to 100° C., and most preferably 40 to 90° C. By performing this step at a high temperature, the drying rate when the second ink composition contains a solvent can be increased.

Furthermore, the range of variation in glossiness can be broadened by adjusting the temperature of this step depending on the glass transition temperature of the second thermoplastic resin.

The temperature for forming the base layer and the temperature for forming the metallic gloss layer are preferably the same from the viewpoint of simplifying the ink jet recording apparatus, but may be different from each other according to need.

1.6. Second Ink Composition

The second ink composition contains at least the metallic pigment and the second thermoplastic resin. The components contained in the second ink composition will be described below.

(1) Metallic Pigment

The metallic pigment contained in the second ink composition may be any metallic pigment as long as droplets of the ink composition can be discharged by the ink jet recording method. The metallic pigment has a function of imparting metallic gloss to the second ink composition adhered on the base layer and can also impart metallic gloss to adhering matter. Examples of the metallic pigment include particles of silver, gold, platinum, nickel, chromium, tin, zinc, indium, titanium, and copper. These metals can be used alone or as an alloy or mixture thereof.

The metallic pigment used in this embodiment is preferably aluminum or an aluminum alloy, from the viewpoints of their high degrees of metallic gloss and cost performance. When an aluminum alloy is used, the metallic element or the nonmetallic element that is added to aluminum is not particularly limited as long as it has matallic gloss, and examples thereof include silver, gold, platinum, nickel, chromium, tin, zinc, indium, titanium, and copper. At least one selected from these elements can be preferably used.

When the exemplified metallic pigment is used, restrictions such that the metallic pigment has a size that allows the ink jet recording apparatus to discharge droplets of the second ink composition and that the viscosity of the second ink composition is not too high may occur. Based on these reasons, the metallic pigment is preferably a so-called plate-like particle. By using such a metallic pigment, the metallic gloss of the metallic gloss layer formed on the base layer can be further enhanced. In addition, by using such a metallic pigment, the second ink composition can be easily applied to the ink jet recording method. Therefore, for example, the concentration of the metallic pigment in the second ink composition can be increased, resulting in a further enhancement of gloss of the metallic gloss layer.

The term "plate-like particle" refers to a particle having an approximately flat surface (X-Y plane) and an approximately uniform thickness. Metallic pigment particles having an approximately flat surface and an approximately uniform thickness can be produced by pulverizing a metal evaporated film. Therefore, the major axis and the minor axis on the flat surface and the thickness can be denoted as X, Y, and Z, respectively.

In the plate-like metallic pigment particles, when the major axis and the minor axis of a flat surface of each plate-like particle are respectively denoted as X and Y and the thickness of the plate-like particle is denoted as Z, the circle-equivalent diameters determined from the X-Y plane areas of the plate-like particles preferably satisfy the requirements that the 50% mean particle diameter R50 is 0.5 to 3 μm and that R50/Z>5. The 50% mean particle diameter R50 is more preferably 0.75 to 2 μm. When the 50% mean particle diameter R50 is smaller than 0.5 μm, an image having insufficient background-covering ability may be formed. On the other hand, when the 50% mean particle diameter R50 is larger than 3 μm, the printing stability may be decreased. In addition, the relationship between the 50% mean particle diameter R50 of the circle-equivalent diameters and the thickness Z preferably satisfies the requirement, R50/Z>5. When the requirement, R50/Z>5, is satisfied, a metallic gloss layer having high background-covering ability can be formed. When the value of R50/Z is 5 or less, the background-covering ability of the metallic gloss layer may be insufficient.

The maximum particle diameter Rmax of the circle-equivalent diameters determined from the X-Y plane areas of the plate-like particles is preferably 10 μm or less from the viewpoint of preventing clogging of an ink jet recording apparatus by the ink composition. By regulating the Rmax to 10 μm or less, clogging of, for example, the nozzle of an ink jet recording apparatus and the filter disposed in an ink channel for removing foreign matter can be prevented.

Here, the term "circle-equivalent diameter" refers to the diameter of a circle that has the same projected area as that of the approximately flat surface (X-Y plane) of the plate-like particle. For example, when the approximately flat surface (X-Y plane) of a plate-like particle is a polygon, the diameter of a circle obtained by converting the projected image of the polygon so that the circle has the same area as that of the polygon is the circle-equivalent diameter of the plate-like particle.

The 50% mean particle diameter R50 of the circle-equivalent diameters of plate-like particles refers to the circle-equivalent diameter corresponding to the 50% point of the total number of the measured particles, when number (frequency) distribution of particles with respect to circle-equivalent diameters is drawn.

The major axis X the minor axis Y of the flat surface of a plate-like particle and the circle-equivalent diameter can be measured with, for example, a particle image analyzer. Examples of the particle image analyzer include flow particle image analyzers of Sysmex Corporation, FPIA-2100, FPIA-3000, and FPIA-3000S.

The plate-like particles of a metallic pigment can be produced, for example, as follows. A composite pigment base substrate having a structure in which a peeling resin layer and a metal or metal compound layer are sequentially laminated on a sheet-like base material is prepared. Plate-like particles are prepared by peeling the metal or metal compound layer from the sheet-like base material at the interface between the metal or metal compound layer and the peeling resin layer, and pulverizing and miroparticulating the metal or metal compound layer.

The metal or metal compound layer is preferably formed by vacuum deposition, ion plating, or sputtering.

The thickness of the metal or metal compound layer is preferably 20 to 100 nm. By doing so, the average thickness of the pigment can be controlled in 20 to 100 nm. A thickness of 20 nm or more provides excellent reflection and glossiness to increase the performance as a metallic pigment. On the other hand, by controlling the thickness to 100 nm or less, an increase in apparent specific gravity can be inhibited to ensure dispersion stability of the metallic pigment in the ink composition.

The peeling resin layer in the composite pigment base substrate is an under coat layer for the metal or metal compound layer and serves as a peelable layer for improving the peelability from the surface of the sheet-like base material. Preferred examples of the resin used for the peeling resin layer include polyvinyl alcohol, polyvinyl butyral, polyethylene glycol, polyacrylic acid, polyacrylamide, cellulose derivatives, acrylic acid polymers, and denatured nylon resins.

The peeling resin layer can be formed by applying a solution of one of the above-mentioned resins or a mixture of two or more thereof to a sheet-like base material, followed by drying. The application solution can contain an additive such as a viscosity modifier.

The application of the peeling resin layer can be performed by a known technology such as gravure coating, roll coating, blade coating, extrusion coating, dip coating, or spin coating, which are usually used. After the application and drying, according need, the surface may be smoothed by calender treatment.

The thickness of the peeling resin layer is not particularly limited, but is preferably 0.5 to 50 μm and more preferably 1 to 10 μm. A thickness smaller than 0.5 μm is an insufficient amount as a dispersion resin. A thickness larger than 50 μm tends to cause peeling at the interface with the pigment layer when rolled.

The sheet-like base material is not particularly limited, but examples thereof include polyester films such as polytetrafluoroethylene, polyethylene, polypropylene, and polyethylene terephthalate; polyamide films such as Nylon 66 and Nylon 6; and mold-releasing films such as polycarbonate films, triacetate films, and polyimide films. Among them, polyethylene terephthalate and copolymers thereof are preferred.

The thickness of the sheet-like base material is not particularly limited, but is preferably 10 to 150 μm. A thickness of 10 μm or more does not cause problems in handling during a processing step and so on, and a thickness of 150 μm or less provides high flexibility not to cause problems in rolling, peeling, and so an.

The metal or metal compound layer may be disposed between protection layers, as described in JP-A-2005-68250. Examples of the protection layers include silicon oxide layers and resin protection layers.

The silicon oxide layer is not particularly limited as long as the layer contains silicon oxide, but is preferably formed by a sol-gel method from an silicon alkoxide such as tetraalkoxysilane or a polymer thereof. The silicon oxide layer is formed as a coating film by applying an alcohol solution dissolving silicon alkoxide or a polymer thereof, followed by heating and baking.

The protection resin layer is not particularly limited as long as the layer is made of a resin not being dissolved in a dispersion medium. Examples of the resin include polyvinyl alcohol, polyethylene glycol, polyacrylic acid, polyacrylamide, and cellulose derivatives. Among them, polyvinyl alcohol and cellulose derivatives are preferred for forming the protection layers.

The protection resin layer can be formed by applying an aqueous solution of one of the above-mentioned resins or a mixture of two or more thereof, followed by drying. The application solution can contain an additive such as a viscosity modifier. The application of silicon oxide and the resin can be performed by a method similar to the application of the peeling resin layer.

The thickness of the protection layer is not particularly limited, but is preferably in the range of 50 to 150 nm. A thickness of smaller than 50 nm causes insufficient mechanical strength, but a thickness of larger than 150 nm causes difficulties in pulverization and dispersion due to too high strength and further may cause peeling at the interface with the metal or metal compound layer.

Furthermore, a color material layer may be provided between the "protection layer" and the "metal or metal compound layer", as described in JP-A-2005-68251.

The color material layer is disposed for obtaining an appropriate colored composite pigment and is not particularly limited as long as it can contain a color material that can provide intended tone and hue, in addition to the metallic gloss, brilliance, and background-covering ability of the metal pigment used in the embodiment. The color material used in the color material layer may be either a dye or a pigment, and known dyes and pigments can be arbitrarily used.

The "pigment" used in the color material layer in this case refers to those defined in the field of general engineering, such as natural pigments, synthetic organic pigments, and synthetic inorganic pigments.

The color material layer may be formed by any mathod without particular limitation, but is preferably formed by coating. When the color material contained in the color material layer is a pigment, it is preferable that the layer further contain a color material-dispersing resin. The color material layer containing the color material-dispersing resin is preferably formed as a thin resin film by dispersing or dissolving the pigment, the color material-dispersing resin, and, according to need, other additives in a solvent and forming a uniform liquid film of the resulting solution or dispersion by spin coating, followed by drying. It is preferable that both the color material layer and the protection layers be formed by coating when the composite pigment base substrate is produced, from the standpoint of work efficiency.

The composite pigment base substrate can have a layer configuration having a plurality of laminar structures each composed of the peeling resin layer and the metal or metal compound layer sequentially laminated. In such a case, the total thickness of the laminar structures including a plurality of metal or metal compound layers, that is, the thickness of (metal or metal compound layer/peeling resin layer/metal or metal compound layer), or (peeling resin layer/metal or metal compound layer), excluding the sheet-like base material and the peeling resin layer directly disposed thereon, is preferably 5000 nm or less. When the thickness is not larger than 5000 nm, cracking and peeling are hardly caused in the composite pigment base substrate even when it is rolled and thus provides excellent storage properties, and also excellent glossiness and background-covering ability are still maintained after being formed into a pigment. Thus, such a thickness is preferred. Furthermore, the peeling resin layer and the metal or metal compound layer may be laminated alternately on each of both surfaces of the sheet-like base material, but the configuration is not limited to these structures.

The peeling method from the sheet-like base material is not particularly limited. Preferred is a method in which the composite pigment base substrate is immersed in a liquid for peeling or a method in which the composite pigment base substrate is immersed in a liquid and is simultaneously sonicated for peeling and pulverizing the peeled composite pigment at the same time.

In the thus obtained plate-like metallic pigment particles, the peeling resin layer functions as protective colloid, and thereby a stable dispersion can be obtained by merely performing dispersion treatment in a solvent. When the second ink composition of the embodiment contains such a metallic pigment, the resin originated from the peeling resin layer also can provide adhesiveness to a recording medium.

The concentration of the metallic pigment is preferably 0.1 to 3.0% by mass, more preferably 0.25% to 2.5% by mass, and most preferably 0.5% to 2.0% by mass based on the total mass of the second ink composition.

(2) Second Thermoplastic Resin

The second thermoplastic resin contained in the second ink composition may be any resin that allows droplets of the ink composition to be discharged by an ink jet recording method and has a Tg higher than the Tg of the first thermoplastic resin. The type of the second thermoplastic resin can be any of those exemplified in the section, "1.4.(1) First thermoplastic resin".

One function of the second thermoplastic resin is to provide adhesiveness among the metallic pigment particles contained in the second ink composition when the second ink composition adheres to the base layer and, thereby, to inhibit, for example, peeling of the metallic pigment. As a result, the abrasion resistance of the metallic gloss layer can be increased. Another function of the second thermoplastic resin, when the second ink composition contains plate-like metallic pigment particles, is to arrange the metallic pigment particles in such a manner that the flat surfaces of the metallic pigment particles are parallel to the surface of the base layer. As a result, the gloss of the metallic gloss layer is further enhanced. The mechanism for expressing this function is not clear, but it is thought that the function is caused by deformation of the second thermoplastic resin and viscosity distribution or change in viscosity of the second ink composition. Therefore, a further satisfactory metallic gloss surface can be formed when the metallic gloss layer is formed on the base layer. Furthermore, another function of the second thermoplastic resin is to provide slight asperities on the surface of the metallic gloss layer. By this function, for example, texture, such as dulling and matte, can be added to the gloss to broaden the range of variation in glossiness.

The weight-average molecular weight of the second thermoplastic resin is 10000 to 150000 and preferably 10000 to 100000. When the molecular weight of the second thermoplastic resin is smaller than 10000, the effect of the metallic pigment as a binder when the second ink composition adheres to the base layer may be decreased. When the molecular weight of the second thermoplastic resin is larger than 150000, the viscosity of the second ink composition may be increased so that droplets of the second ink composition cannot be discharged by an ink jet recording apparatus.

The second thermoplastic resin may be contained in the second ink composition in a solution form, in an emulsion form, or in a form in which the resin particles are dispersed. When the second ink composition contains the second thermoplastic resin in a particle form, the particle diameter of the particle is preferably 0.1 to 20 μm and more preferably 0.5 to 10 μm. A particle diameter larger than 20 μm may cause clogging of the nozzle of an ink jet recording apparatus.

When the temperature of the base layer forming step and the temperature of the metallic gloss layer forming step are the same temperature that is lower than the Tg of the second thermoplastic resin, a higher Tg of the second thermoplastic resin increases the allowable range of the temperature to be set for the steps. Furthermore, a larger difference between the Tg of the second thermoplastic resin and the Tg of the first thermoplastic resin can increase the difference between the temperature of the metallic gloss layer forming step and the Tg of the second thermoplastic resin, when the temperature of the metallic gloss layer forming step is set to a temperature between these Tg's. Therefore, in such a case, the functions of the second thermoplastic resin and the first thermoplastic resin can be enhanced.

The glass transition temperature of the second thermoplastic resin is preferably 80° C. or more, more preferably 100° C. or more, and most preferably 140° C. or more. In particular, when the glass transition temperature of the second thermoplastic resin is 140° C. or more, since the temperature of the metallic gloss layer forming step can be set to a temperature that is sufficiently lower than the glass transition temperature of the second thermoplastic resin, the metallic gloss can be easily varied by being provided with, for example, matte, while increasing the abrasion resistance of the metallic gloss layer.

The content of the second thermoplastic resin in the second ink composition is 0.01 to 50% by mass, preferably 0.05 to 40% by mass, and most preferably 0.1 to 30% by mass.

(3) Other Components

The second ink composition can further contain other components. Examples of the components that can be contained in the second ink composition include organic solvents, surfactants, color materials, dispersants, stabilizers such as antioxidants and ultraviolet absorbers, and other resin components. When the second ink composition contains a color material, the metallic gloss layer is colored to give colored metallic gloss. Since these components are the same as those described in the section, "1.4. First ink composition", the descriptions thereof are omitted.

1.7. Physical Properties of Each Ink Composition

The physical properties of the first ink composition and the second ink composition are not particularly limited, but, for example, the surface tension is preferably 20 to 50 mN/m. When the surface tension is smaller than 20 mN/m, the ink composition may wet and spread around the nozzle of an ink jet recording apparatus or bleeds from, for example, the nozzle, which makes discharge of droplets difficult. When the surface tension is larger than 50 mN/m, the ink composition does not wet and spread on an adhesion target, which makes printing unsatisfactory.

The viscosities of the first ink composition and the second ink composition are each preferably 2 to 10 mPa·s at 20° C. and more preferably 3 to 5 mPa·s. The ink compositions each having a viscosity within the above-mentioned range at 20° C. are further suitable for an ink jet recording apparatus, and an appropriate amount of each ink composition can be discharged from the nozzle, and curved flight and scattering can be further decreased.

According to the ink jet recording method described above, the Tg of the first thermoplastic resin contained in the first ink composition is lower than that of the second thermoplastic resin contained in the second ink composition; the temperature of the base layer forming step is higher than the Tg of the first thermoplastic resin. Therefore, the first ink composition is prevented from infiltrating into a textile product (recording medium), and also the surface of the base layer can be smoothed. Furthermore, a metallic gloss layer is formed by the second ink composition on the base layer having a high degree of evenness. Therefore, an image having satisfactory metallic gloss can be recorded on the textile product.

2. Recorded Matter

The recorded matter obtained by the ink jet recording method according to this embodiment has a metallic gloss surface having a high degree of glossiness formed on a textile product.

3. Ink Set

An ink set according to this embodiment includes at least the first ink composition and the second ink composition. The ink set may include one or more of each of the ink compositions. The ink set may further contain one or more other ink compositions. Examples of the additional ink compositions that may be provided to the ink set include color ink compositions, such as cyan, magenta, yellow, light cyan, light magenta, dark yellow, red, green, blue, orange, and violet, a black ink composition, and a light black ink composition.

4. Ink Cartridge and Ink Jet Recording Apparatus

An ink cartridge according to this embodiment is provided with the above-mentioned ink set. By doing so, the ink set having the photo-curable ink compositions for ink jet recording can be easily transported. The ink jet recording apparatus according to the embodiment is provided with each of the ink compositions and the ink set or the ink cartridge. For example, the ink jet recording apparatus described in the section, "1. Ink jet recording method" can be exemplified.

5. Example and Comparative Example

The invention will be more specifically described by an example and a comparative example, but the scope of the invention is not limited thereto.

5.1. Textile Product In Example and Comparative Example, as the textile product, a cotton fabric sticker (model No.: JP-NU4) for ink jet printing, a product of Sanwa Supply Inc., was used.

5.2. Preparation of First Ink Composition and Second Ink Composition

The first ink composition and the second ink composition shown in Table 1 were prepared as follows.

TABLE 1

| | | % by mass | | |
|---|---|---|---|---|
| | | First ink com position (A1) | First ink com- position (A2) | Second ink com- position |
| Organic solvent | diethylene glycol diethyl ether | 63.6 | 63.8 | 65.1 |
| | γ-butyrolactone | 15 | 15 | 15 |
| | tetraethylene glycol dimethyl ether | 18 | 18 | 18 |
| First thermoplastic resin | N-2043-60MEX | 3 | — | — |
| | Paraloid B-60 | — | 3 | — |
| Second thermoplastic resin | cellulose acetate butylate | — | — | 0.2 |
| Other resin component | cellulose acetate butylate | 0.2 | — | — |
| Surfactant | BYK-UV3500 | 0.2 | 0.2 | 0.2 |
| Metallic dispersion (solid matter concentration) | | — | — | 1.5 |

5.2.1. First Ink Composition

The first ink composition (A1) having the composition shown in Table 1 was prepared.

Ethylene glycol diethyl ether, γ-butyrolactone, and tetraethylene glycol dimethyl ether were used as organic solvents, and an acrylic resin having a Tg of −50 to −60° C. (Hariacron N-2043-60MEX: a product of Harima Chemicals, Inc.) was used as the first thermoplastic resin. BYK-UV3500 (a silicone-based surfactant containing an acrylic group, a product of BYK-Chemie) was used as the surfactant. Furthermore, cellulose acetate butylate (butylation ratio: 35 to 39%, molecular weight: 70000, Tg=141° C.) was further added to the first ink composition (A1) as an additional resin component. The first ink composition was mixed by the following procedure: The organic solvents, cellulose acetate butylate, and the surfactant were mixed and dissolved, and then the acrylic resin was added to the resulting ink solvent. Furthermore, the mixture was mixed and stirred with a magnetic stirrer for 30 minutes under ordinary temperature and ordinary pressure, followed by filtration with a PTFE membrane filter having a pore size of 5 μm. Thus, the first ink composition (A1) was prepared.

In the first ink composition (A2), "Paraloid B-60", a product of Rohm and Haas Company, (molecular weight: 60000, Tg=75° C., methyl methacrylate-butyl methacrylate copolymer) was used as the first thermoplastic resin, instead of the acrylic resin having a Tg of −50 to −60° C. (Hariacron N-2043-60MEX: a product of Harima Chemicals, Inc.) serving as the first thermoplastic resin in the first ink composition (A1); and cellulose acetate butylate was not added to the first ink composition (A2). The first ink composition (A2) was prepared as in the first ink composition (A1).

5.2.2. Second Ink Composition

In order to prepare a metallic pigment to be added to the second ink composition, a metallic pigment dispersion solution was first prepared.

A resin layer coating solution composed of 3.0% by mass of cellulose acetate butylate (butylation ratio: 35 to 39%, a product of Kanto Chemical Co., Ltd.) and 97% by mass of diethylene glycol diethyl ether (a product of Nippon Nyukazai Co., Ltd.) was uniformly applied onto a PET film having a thickness of 100 μm by bar coating, followed by drying at 60° C. for 10 min. Thus, a resin layer thin film was formed on the PET film.

Then, an aluminum deposition layer having an average thickness of 20 nm was formed on the resin layer using a vacuum deposition apparatus ("VE-1010 vacuum deposition apparatus", a product of Vacuum Device Inc.).

Then, the laminate formed by the above-described process was simultaneously peeled, pulverized so as to be reduced in size, and dispersed in diethylene glycol diethyl ether using an ultrasonic disperser (VS-150, a product of As One Corp.) to prepare an metallic pigment dispersion that has been subjected to ultrasonic dispersion treatment for 12 hours in total.

The resulting metallic pigment dispersion was filtered through an SUS mesh filter with a pore size of 5 μm to remove coarse particles. Then, the filtrate was put in a round-bottomed flask, and diethylene glycol diethyl ether was distilled off using a rotary evaporator to concentrate the metallic pigment dispersion. Then, the concentration of the metallic pigment dispersion was adjusted to 5% by mass.

The particle size distribution and the 50% volume-average particle diameter of the metallic pigment particles were measured using a laser particle distribution analyzer ("LM-30", a product of Seishin Enterprise Co., Ltd.) to confirm that the 50% mean particle diameter was 1.03 μm and the maximum particle diameter was 4.9 μm.

The 50% mean particle diameter R50 of the circle-equivalent diameters of major axis (X direction)-minor axis (Y direction) planes of metallic pigment particles and the average film thickness Z were measured using a particle diameter/particle distribution measuring apparatus (FPIA-3000S, a product of Sysmex Corporation), and the R50/Z was calculated based on the resulting measured values of R50 and Z to confirm that the average particle diameter Rmax was 3.2 μm, the 50% mean particle diameter R50 was 0.89 μm, the average film thickness Z was 0.02 μm, and the R50/Z was 44.5. The particle size distribution (CV value) was determined by the calculation expression: CV value=(standard deviation of particle size distribution)/(average of particle diameter)×100. The particle size distribution (CV value) was 38.2.

The average film thickness of the metallic pigment particles was determined by observing randomly selected ten particles with an electronic microscope to be 20 nm.

The second ink composition having the composition shown in Table 1 was prepared.

As the organic solvent, ethylene glycol diethyl ether, γ-butyrolactone, and tetraethylene glycol dimethyl ether were used. In the second ink composition, as the second thermoplastic resin, cellulose acetate butylate (butylation ratio: 35 to 39%, Tg=141° C.) was used. As the surfactant, BYK-UV3500 (silicone-based surfactant containing an acrylic group, a product of BYK-Chemie) was used. The second ink composition was mixed by the following procedure: The metallic pigment dispersion, the organic solvents, and the surfactant were mixed and dissolved, and then the second ink composition was added to the resulting ink solvent. Furthermore, the mixture was mixed and stirred with a magnetic stirrer for 30 minutes under ordinary temperature and ordinary pressure, followed by filtration with a PP pleat capsule filter (CCP-3-C1B, a product of Advantec Mfs, Inc.) having a pore size of 5 μm. Thus, the second ink composition was prepared.

5.3. Production of Evaluation Sample

Each sample of Example was produced using an ink jet printer, SP-300V (Roland D.G. Corporation), as the ink jet recording apparatus. The first ink composition and the second ink composition were used instead of the cyan ink and the yellow ink, respectively, of the printer, and the magenta ink and the black ink of the printer were used without change. The printer was provided with a temperature-controllable roller so that a recording medium (textile product) can be heated at the printing position.

Table 2 shows conditions (temperature of formation and used ink composition for the base layer) for producing the samples of Example and Comparative Example.

TABLE 2

| | | Example | Comparative Example |
|---|---|---|---|
| Temperature of base layer formation (° C.) | | 45 | 45 |
| First ink composition | Type | A1 | A2 |
| | Tg of first thermoplastic resin (° C.) | −50 to −60 | 75 |
| Second ink composition | Tg of second thermoplastic resin (° C.) | 141 | 141 |
| Evaluation result of metallic gloss | | A | C |

Each sample was printed by setting the temperature of the roller of the printer to that shown in Table 2, forming the base layer by the first ink composition, and forming the metallic gloss layer on the base layer by the second ink composition. In printing of each sample, the base layer was formed by repeating solid printing ten times, and, subsequently, the metallic gloss layer was formed by repeating solid printing twice. The ink amount used as the base layer and the metallic gloss layer of each sample was 1.6 $mg/cm^2$. The produced samples were dried at ordinary temperature for 8 hours and then subjected to evaluation.

5.4. Evaluation Method

Each sample was visually investigated for evaluation. A sample having excellent metallic gloss was ranked as "A", and a sample having insufficient metallic gloss was ranked as "C". The observation results are shown in Table 2.

5.5. Evaluation Result

As shown in Table 2, in the textile product of Example, the Tg of the first thermoplastic resin contained in the first ink composition is lower than that of the second thermoplastic resin contained in the second ink composition, and satisfactory metallic gloss was obtained. It is thought that this result shows that, when the base layer is formed in Example, the first ink composition is prevented from infiltrating into the textile product (recording medium) and that the surface of the base layer is smoothed.

According to the ink jet recording method of the invention, an image having satisfactory metallic gloss can be recorded on a textile product. Therefore, for example, it can satisfy the requirement for printing an image having metallic gloss easily and inexpensively using an inexpensive printer.

What is claimed is:

1. An ink jet recording method for recording an image having metallic gloss on a textile product using an ink jet recording apparatus, the method comprising:

forming a base layer by applying a first ink composition containing a first thermoplastic resin on the textile product; and forming a metallic gloss layer by applying a second ink composition containing a metallic pigment and a second thermoplastic resin on the base layer, wherein the glass transition temperature of the first thermoplastic resin is not higher than that of the second thermoplastic resin; and the formation of the base layer is performed at a temperature not lower than the glass transition temperature of the first thermoplastic resin.

2. The ink jet recording method according to claim 1, wherein the glass transition temperature of the first thermoplastic resin is −50° C. or less; and the glass transition temperature of the second thermoplastic resin is 140° C. or more.

3. The ink jet recording method according to claim 1, wherein the formation of the base layer is performed at 40 to 90° C.

4. The ink jet recording method according to claim 1, wherein the metallic pigment is plate-like particles made of aluminum or an aluminum alloy, and when the major axis and the minor axis of a flat surface of each plate-like particle are respectively denoted as X and Y and the thickness of the plate-like particle is denoted as Z, the circle equivalent diameters determined from the X-Y plane areas of the plate-like particles satisfy the requirements that the 50% mean particle diameter R50 is 0.5 to 3 μm and that R50/Z>5.

5. The ink jet recording method according to claim 1, wherein the weight-average molecular weight of each of the first and the second thermoplastic resins is 10000 to 150000.

* * * * *